_United States Patent_ [19]

Lemper et al.

[11] 4,079,034

[45] Mar. 14, 1978

[54] NON-BLOOMING HALOGEN-CONTAINING ADDITIVES FOR PLASTICS

[75] Inventors: Anthony L. Lemper, Amherst; Jerold C. Rosenfeld, Tonawanda, both of N.Y.

[73] Assignee: Hooker Chemicals & Plastics Corporation, Niagara Falls, N.Y.

[21] Appl. No.: 542,638

[22] Filed: Jan. 20, 1975

[51] Int. Cl.$^2$ .................. C08K 5/53; C08L 67/06
[52] U.S. Cl. .................. 260/45.7 P; 260/45.7 R; 260/45.7 S; 260/45.7 RT; 260/45.85 T; 260/45.85 N; 260/45.9 QB; 260/860
[58] Field of Search ............ 260/860, 45.85 T, 45.7 P, 260/45.7 R, 45.9 QB, 45.85 N, 45.7 S, 45.7 T

[56] References Cited

U.S. PATENT DOCUMENTS

| | | | |
|---|---|---|---|
| 3,406,224 | 10/1968 | McDonough | 260/860 |
| 3,723,172 | 3/1973 | Ismail | 156/306 |
| 3,833,685 | 9/1974 | Wambach | 260/860 |
| 3,867,336 | 2/1975 | Fox | 260/45.7 R |
| 3,883,471 | 5/1975 | Stackman et al. | 260/45.85 T |
| 3,989,531 | 11/1976 | Orlando et al. | 106/15 FP |

FOREIGN PATENT DOCUMENTS 2,341,108   2/1974   Germany.

_Primary Examiner_—Murray Tillman
_Assistant Examiner_—Thurman K. Page
_Attorney, Agent, or Firm_—Peter F. Casella; James F. Mudd

[57] ABSTRACT

An aromatic polyester of an aromatic dicarboxylic acid and halogenated bisphenol having a glass transition point above about 175° C is employed as a non-blooming fire retardant additive for polymer compositions.

17 Claims, No Drawings

NON-BLOOMING HALOGEN-CONTAINING ADDITIVES FOR PLASTICS

BACKGROUND OF THE INVENTION

It is known that the fire retardancy of polymeric compositions can be improved by the incorporation of halogen compounds therein. Chlorinated materials are among the most common and are usually combined with an inorganic agent such as antimony trioxide. It is also known that certain bromine compounds are effective fire retarding agents and have an advantage, vis-a-vis the chlorine materials, because the same level of fire retardancy can usually be obtained with a smaller amount of additive. Most bromine containing compounds, however, are not stable at the elevated temperatures often encountered in the processing polymeric compositions, e.g., the elevated temperatures required for molding high molecular weight polymers.

Bialous in U.S. Pat. No. 3,673,278 teaches a thermoplastic resin composition asserted to have improved flame retardant and drip control properties which is an admixture of a flame retardant polycarbonate resin and poly(tetrafluoroethylene). The flame retardant aromatic polycarbonates are polymers of a halogen-substituted dihydric phenol such as tetrabromobisphenol-A [2,2-bis-3,5-dibromo-4-hydroxyphenyl(propane)]. Abolins teaches that flame retardant thermoplastic molding compositions can be obtained by incorporating the Bialous admixture with a normally flammable linear polyester and filamentous glass. U.S. Pat. No. 3,334,154 also relates to polycarbonates containing halogenated bisphenols.

General Electric markets one of Bialous' flame retardant aromatic polycarbonate compositions, in particular a polycarbonate prepared from bisphenol-A, tetrabromobisphenol-A and phosgene, as an additive for polybutylene terephthalate injection molding compositions. The brominated polycarbonate additive is used at relatively high levels, about 30%, and if the injection molding is carried out according to the recommended procedure, no problems are encountered. Unfortunately, injection molders often inadvertently wander from the recommended processing conditions, particularly with respect to the processing temperature, which results in a high rejection rate for the final molded product. The tetrabromobisphenol-A polycarbonate melts under such conditions which appears to cause the additive to agglomerate in localized areas instead of being uniformly dispersed throughout the composition. As a consequence, some areas on the product are highly fire retardant while other areas are not fire retardant at all, and particularly with small objects, there is a possibility that the item will contain insufficient of the localized concentration of fire retardant additive and hence be completely flammable.

Other brominated materials have been used for increasing the fire retardancy of thermoplastic compositions used for molding applications. As but one example, reference is made to Schwarz U.S. Pat. No. 3,645,962 which teaches the use of a brominated polyether.

Ismail, in U.S. Pat. No. 3,723,172 teaches that polyesters of an aromatic dicarboxylic acid and a halogenated dihydric phenol (e.g., tetrabromobisphenol-A) can be used as a fire retardant coating for synthetic resinous bodies. Such fire retardant coatings for resinous bodies are susceptible to damage by abrasion and removal by solvents, as compared to inherent fire retardant provided by incorporation of the fire retarding body within the polymers. In addition to being expensive, such coatings are difficult to apply uniformly to a complex molded article.

We have now found that aromatic polyesters of an aromatic dicarboxylic acid and halogenated bisphenols, particularly brominated bisphenols, can be employed as a fire retardant additive and have particular advantageous properties if their glass transition point is above 175° C. This polyester additive can be used in molding compositons and does not melt should the molder inadvertently employ a processing temperature which is somewhat higher than the recommended upper limit. As a result, the additive can eliminate the high rejection rate. Additionally, the polyester additive is non-blooming, i.e. has little or no tendency to migrate to the plastic surface during processing and heat ageing that is often encountered in use. Bloom is a severe problem with monomeric halogen-containing additives. When the additive migrates to the plastic surface, it can be lost from the article as a result of routine abrasion or rubbing which, in turn, causes the object to lose the fire retardant properties for which the additive was used. Blooming also detracts from the appearance of the molded article.

Accordingly, it is the object of this invention to provide a halogencontaining fire retardant additive which is characterized by having little or no tendency to migrate to the surface during molding and in use also has sufficient stability to permit it to be molded with various plastics. This and other objects of the present invention will become apparent to those skilled in the art from the following detailed description of the invention.

SUMMARY OF THE INVENTION

This invention relates to fire retardant plastic compositions and, more particularly, to fire retardant plastic compositions in which the fire retardant additive is an aromatic polyester of an aromatic dicarboxylic acid and a halogenated bisphenol, particularly compounds of the formula:

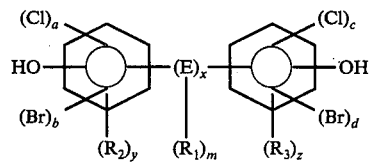

wherein
E is a divalent (or di-substituted) alkylene, haloalkylene, cycloalkylene, halocycloalkylene, arylene, haloarylene, —O—, —S—, —SO—, —SO$_2$—, —SO$_3$—, —CO—,

or R$_5$N;
R$_1$, is alkyl, haloalkyl, aryl, haloaryl, alkylaryl, haloalkylaryl, arylalkyl, haloarylalkyl, cycloalkyl, or halocycloalkyl;
R$_2$ and R$_3$ are independently selected from hydrogen and R$_1$;

$R_4$ and $R_5$ are independently selected from hydrogen, $R_1$ and $OR_1$;

$m$ is an integer from 0 to the number of replaceable hydrogen atoms on E;

$a$, $b$, $c$ and $d$ are 0 to 4;

$a + b$ is 1 to 4 and $c + d$ is 1 to 4;

$x$ is 0 to 1

$y$ is $4-(a+b)$, and $z$ is $4-(c+d)$.

The foregoing hydrocarbon radicals preferably have carbon atoms as follows: alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons.

DESCRIPTION OF THE PREFERRED EMBODIMENTS

In accordance with the present invention, the fire retardant additive used is an aromatic polyester of an aromatic dicarboxylic acid and halogenated bisphenols having a glass transition point above about 175° C. Glass transition temperatures were determined by differential scanning calorimetry at a heating rate of 10° C per minute, using a Perkin-Elmer DSC-2 instrument.

The halogenated bisphenols useful in the polyesters of the invention include: 2,2-bis(3-chloro-4-hydroxyphenyl) propane; 4,4'-(cyclohexylmethylene) bis(2,6-dichlorophenol); 2,2-bis-(3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl)-hexane, 4,4'-dihydroxy-3,3', 5,5'-tetrachlorodiphenyl, 2,2-bis-(3,5-dibromo-4-hydroxyphenyl)-propane, 2,2-bis-(3,5-dichloro-4-hydroxyphenyl)-propane, tetrachlorodiphenylolsulfone, bis(3,5-dibromo-4-hydroxyphenyl) phenyl phosphine oxide, bis(3,5-dibromo-4-hydroxyphenyl) sulfoxide, bis(3,5-dibromo-4-hydroxyphenyl)-sulfone, bis(3,5-dibromo-4-hydroxyphenyl)sulfonate, bis(3,5-dibromo-4-hydroxyphenyl)-sulfide, bis(3,5-dibromo-4-hydroxyphenyl)amine, bis(3,5-dibromo-4-hydroxyphenyl)ketone, and 2,3,5,6, 2',3',5',6'-octochloro-4,4'-hydroxy biphenyl. The bisphenols can contain 12 to about 30 carbon atoms and preferably 12 to about 25 carbon atoms.

The polynuclear condensed bivalent phenols are derived essentially from the dihydroxynaphthalenes. Suitable halogenated phenols of this kind are, for example, the dichloro and dibromo compounds as well as the tetrabromo and tetrachloro dihydroxynaphthalenes, and also 3,5,3',5'-tetrachloro and 3,5,3',5'-tetrabromophenolphthalines and their isomers.

The aromatic dicarboxylic acid component of the polyester can be a single acid, e.g., terephthalic acid, or can be a mixture of acids, e.g., terephthalic acid and isophthalic acid. Similarly, the bisphenol can be the sole base component of the polyester or it can be employed together with other polyhydric alcohols. Dihydric alcohols are preferred, however, higher functional alcohols can be employed. Typical examples include ethylene glycol, diethylene glycol, triethylene glycol, tetraethylene glycol, propylene glycol, dipropylene glycol, polypropylene glycol, hexylene glycol, 2-methyl-2-ethyl-1,3-propandiol, 2-ethyl-1,3-hexanediol, 1,5-pentanediol, thiodiglycol, 1,3-propanediol, 1,3-butanediol, 2,3-butanediol, 1,4-butanediol, 1,3-butylene glycol, neopentyl glycol, 1,2-dimethyl-1,2-cyclopentanediol, the dihydroxy-diphenyls such as 2,2'-dihydroxy-diphenyl, 4,4'-dihydroxy-2-methyldiphenyl, 4,4'-dihydroxy-2,4'-dimethyl diphenyl, glycerol, trimethylol propane, 1,2,4-butanetriol, pentaerythritol, and the like. Halogenated glycols can also be employed such as dibromoneopentyl glycol, dibromobutene diol, oxyalkylated tetrabromobisphenol A, and diols of the formulas:

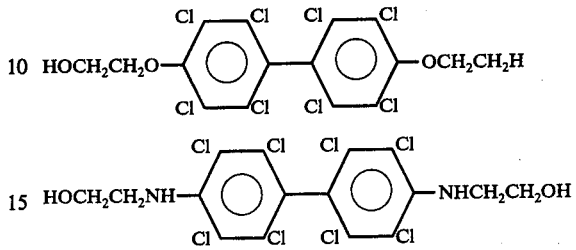

Generally, the polyhydric alcohols have 2–6 hydroxyl groups and about 2-20 carbon atoms. However, it is also useful to include minor amounts of monofunctional hydroxy compounds such as dibromopropanol, tribromoneopentyl alcohol and halophenols of the formula:

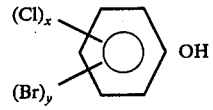

wherein $x$ is 0 to 5, $y$ is 0 to 5, and $x + y$ is 1 to 5.

Aromatic dicarboxylic acids from which the polyesters of this invention are derived are of the general formula $HO_2C-A-CO_2H$ where A is Ar or $-AR-B-Ar$, Ar is arylene such as phenylene, halophenylene, naphthalene, halonaphthalene, and the like, and B is $-O-$, $-S-$, $-SO-$, $-SO_2-$, $-SO_3-$, $-CO-$, $R_4P<=O$, $R_5N<$ or alkylene. Typical examples include terephthalic acid; isophthalic acid; phthalic acid; 2,5-dibromoterephthalic acids; 2,5-dichloroterephthalic acid; tetrabromophthalic anhydride; tetrachlorophthalic anhydride; bis(4-carboxy)-diphenyl; bis(4-carboxyphenyl)-ether; bis(4-carboxyphenyl)-sulfone; bis(4-carboxyphenyl-carbonyl; bis(4-carboxyphenyl)-methane; bis(4-carboxyphenyl)-dichloromethane; 1,2-and 1,1-bis(4-carboxyphenyl)-ethane; 1,1-and 2,2-bis(4-carboxyphenyl)-propane; 1,1- and 2,2-bis (3-carboxyphenyl)-propane; 2,2-bis(4-carboxyphenyl)-1,1-dimethyl-propane; 1,1- and 2,2-bis(4-carboxyphenyl)-butane; 1,1- and 2,2-bis(4-carboxyphenyl)-pentane; 3,3-bis(4-carboxyphenyl)-heptane; 3,3-bis(carboxyphenyl)-heptane, and oxyalkylated tetrabromophthalic acid. A portion of the aromatic dicarboxylic acid can be replaced by an aliphatic or haloaliphatic acid or anhydride such as chlorendic, adipic, sebacic and oxalic.

Whether the aromatic polyester is manufactured from a single acid and halogenated bisphenols or a mixture of acids and bisphenol, or a mixture of halogenated bisphenols and a polyhydric alcohol and an acid or acids, it is important that the aromatic polyester thus produced have a glass transition point above about 175° C. It is preferred that the glass transition point of the polyester be at least about 190° C. In general, increasing the amount of terephthalic acid and/or halogenated bisphenol in the polyester increases the glass transition point. For example, an acceptable polyester can be prepared from 50 mol percent terepthalic acid, 50 mol percent isophthalic acid, 75 mol percent tetrabromo-bisphenol-A and 25 mol percent 1,6-hexanediol. Increasing the mol percentage of the terephthalic acid as the acid component and the mol percent of tetrabromobisphenol-A as the base component will increase the glass transition poing while conversely increasing the mol percentage of the isophthalic acid and the hexanediol will decrease the glass transition point. In general, the aromatic polyesters have an intrinsic viscosity of at least 0.1 and up to 1.5 dicileters per gram, preferably about 0.2 to 0.8 dl/g, measured at 0.5 percent in tetrachloroethane at 30° C.

The preparation of the aromatic polyester additive of the present invention is known per se. For example, the aromatic dicarboxylic acid in the form of the dichloride can be mixed with the tetrabromobisphenol-A and other polyhydric alcohols, in organic solvents, if appropriate, and reacted at a temperature between 0° and 300° C, preferably in the presence of catalysts, with the formation of by-product HCl. Typical procedures are set forth in the following Examples and in the copending applications, (Ser. Nos. 542,635, 542,644, and 542,636), the disclosure of which is hereby incorporated by reference.

The aromatic polyester of the present invention can be used as an additive to impart the fire retardancy to any of the normally flammable plastics. Typical polymers in which the polyester of this invention finds utility as an additive are homopolymers and copolymers of unsaturated aliphatic, alicyclic and aromatic hydrocarbons such as polyethylene, polypropylene, polybutene, ethylene/propylene copolymers, copolymers of ethylene or propylene with other olefins, polybutadiene; polymers of butadiene, polyisoprene both natural and synthetic, polystyrene, polyindene, indenecoumarone resins; polymers of acrylate esters and polymers of methacrylate esters. Other polymers include acrylate and methacrylate resins such as ethyl acrylate, n-butyl methacrylate, isobutyl methacrylate, ethyl methacrylate, and methyl methacrylate, alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfural-ketone); hydrocarbon resins from petroleum; isobutylene resins (polyisobutylene); isocyanate resins (polyurethanes); melamine resins such as melamine-formaldehyde and melamine-urea-formaldehyde; oleoresins; phenolic resins such as phenolformaldehyde, phenolic-elastomer, phenolic-epoxy, phenolic-polyamide, and phenolic-vinyl acetals; polyamide resins such as polyamides and polyamideepoxy; polyester resins such as polyesters (unsaturated) and polyester elastomer and resorcinol resins such as resorcinol-formaldehyde. resorcinolfurfural, resorcinol-phenol-formaldehyde, resorcinol-polyamide and resorcinolurea; rubbers such as natural rubber, synthetic polyisoprene, reclaimed rubber, chlorinated rubber, polybutadiene, cyclized rubber, butadiene-acrylonitrile rubber, butadiene-styrene rubber and butyl rubber; neoprene rubber (polychloroprene); polysulfides (Thiokol); styrene resins (polystyrene); terpene resins; urea resins; vinyl resins such as vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer; polyformaldehyde; bitumens and asphalts.

The aromatic polyesters of the present invention are particularly useful as additives for injection molding thermoplastic compositions and especially the higher molecular weight, normally flammable, linear polymeric glycol esters of terephthalic acid or isophthalic acid such as polyethylene terephthalate, polypropylene terephthalate, polybutylene terephthalate and the like.

The polymeric compositions, and particularly those intended for molding uses, can contain the usual reinforcing fillers such as mineral silicates, silica obtained by evaporation of the silica sol, quartz, silica gel, glass fibers, cristobalite, asbestos, clay, talc, and the like. Small amounts of stabilizing agents, lubricants, dye additives, pigments, antistatic agents, nucleating agents, and the like, can also be present. Any of such additives should, of course, not detrimentally effect the flame retardancy of the composition.

If desired, in addition to the aromatic polyester additive of this invention, metallic compounds of aluminum, zinc, arsenic, antimony or bismuth can also be employed. Hydrated aluminas are the preferred aluminum compounds. Zinc borate is a useful zinc compound. Antimony oxide is the preferred antimony compound although many antimony compounds are suitable. Such compounds include the sulfides of antimony, alkali metal antimonite salts, antimony salts of organic acids and their pentavalent derivatives such as those disclosed in U.S. Pat. No. 2,996,528, and esters of antimonous acids and their pentavalent derivatives such as disclosed in U.S. Pat. No. 2,993,928. Still other suitable organic antimony compounds are the acyclic antimonites such as trimethylol propane antimonite, pentaerythritol antimonite and glycerol antimonite. The corresponding arsenic and bismuth compounds can also be employed, in particular the oxides or arsenic and bismuth.

The compositions of this invention can be prepared by mixing the base polymer with the aromatic polyester and metallic additives and other additives, if used, in the conventional manner, e.g., on roll mills, kneaders or extruders, or by agitating in the presence of an organic solvent. The aromatic polyester is employed in the total polymer composition in an effective fire retardant proportion which, in general, corresponds to a halogen concentration of about 1 to 30 percent by weight, preferably about 3 to 15 percent of the total polymer composition. The metallic additives of antimony, arsenic, and bismuth, zinc and aluminum when used, generally are about 1–30 percent by weight, preferably about 5–20 percent by weight of the total polymer composition.

In order to further illustrate the present invention, various Examples are set forth below. In these Examples, as well as throughout the entire specification and claims, all parts and percentages are by weight and all temperatures are in degrees Centigrade unless otherwise specified.

EXAMPLE 1

A tetrabromobisphenol-A/terephthalate/isophthalate polyester was prepared as follows. 50.75 g (0.25 mol) of terephthaloyl chloride and 50.75 gm (0.25 mol) of isophthaloyl chloride dissolved in 250 ml of methylene chloride was added to a solution containing 272.0 g (0.5 mol) of tetrabromobisphenol-A in 1500 ml of dry pyridine at 0°–5° C over a 1-hour period of time. The mixture was allowed to stir overnight and then the polymeric product was precipitated into water, dissolved in methylene chloride, and then washed first with dilute aqueous HCl and then with distilled water until the washings were found to be chloride free. The methylene chloride was then flashed off by dripping the solution into stirred hot water and the recovered polyester was dried in a vacuum oven. The structure of the polyester was confirmed by NMR and by percent bromine. The polyester had a glass transition temperature about 225° C and an intrinsic viscosity of 0.33. In the following Examples, this polyester is designated as polyester A.

EXAMPLE 2

A tetrabromobisphenol-A/hexanediol/isophthalate/terephthalate polyester was prepared as follows. 50.75 g (0.25 mol) of isophthaloyl chloride and 50.75 g (0.25 mol) of terephthaloyl chloride were charged into a 3-liter flask with approximately 1500 ml of dry methylene chloride. Separately, 14.8 g (0.125 mol) of 1,6-hexanediol and 204 g (0.375 mol) of tetrabromobisphenol-A were dissolved in 500 ml of methylene chloride and the resulting solution was placed in an addition funnel on the 3-liter flask. A second addition funnel containing 111.1 g (1.1 mol) of triethylamine was also placed on the flask. The two solutions were added to the flask simultaneously at 0°–5° C over a 2-hour period and the resulting solution was allowed to stir overnight. Thereafter the solution was washed with dilute aqueous HCl and then with distilled water until the washings were free of chloride. Then, the methylene chloride was flashed off and the polyester dried as set forth in Example 1. The structure of the polyester was confirmed by NMR analysis and percentage bromine. The polyester had a glass transition point of about 191° C and an intrinsic viscosity of 0.25. In the following Examples, this polyester is designated as polyester B.

EXAMPLES 3–6

Polyesters A and B were separately ground into a fine powder in a Wiley mill. They were then mixed with polybutylene terephthalate and antimony trioxide, and in some instances glass fibers, and extruded in a brabender extruder and the resulting formulations were injection molded in an Arburg reciprocating screw machine. The formulations employed and properties of the molded articles are set forth in the following Table.

TABLE

| Formulation | EXAMPLE | | | |
| --- | --- | --- | --- | --- |
| | 3 | 4 | 5 | 6 |
| Additive (A or B), gms | 126.1 of A | 100 of A | 117.5 of B | 95 of B |
| PBT, gms | 738.1 | 590 | 601.9 | 496.9 |
| $Sb_2O_3$, gms | 36.8 | 24.9 | 30.7 | 24.8 |
| Glass Fibers, gms | None | 309.8 | None | 260.9 |
| Percent Bromine | 6.6 | 4.6 | 6.6 | 4.5 |
| Physical Properties | | | | |
| Tensile Strength at Break | 6,700 | 16,900 | 5,100 | 17,200 |
| % Elongation at Break | 4.0 | 5.2 | 2.8 | 5.2 |
| Flexural Strength, psi | 12,100 | 26,800 | 11,500 | 27,100 |
| Flexural Modulus $\times 10^5$ | 3.5 | 12.4 | 3.8 | 13.0 |
| Izod Impact (Notched) | 0.4 | 1.2 | 0.3 | 1.3 |
| Heat Distortion T(° C, 264 psi) | 60 (140° F) | 200.8 | 51.5(125° F) | 197.3 |
| Flame Tests | | | | |
| Oxygen Index | 25.0–28.0 | 27 | 25.0–27.0 | 29 |
| ASTM D635 | SE | SE | SE | SE |
| UL-94 1/8″ Bar | V-2 | V-0 | V-2 | V-0 |
| UL-94 1/16″ Bar | V-2 | V-2 | V-0 | V-0 |

*SE - self-extinguishing

Additional molded specimens of Examples 3 and 5 were hung in a circulating air oven at either 120-+2° C for 13 days or at 150-+3° C for 16 days and periodically checked for bloom by removing each sample from the oven and rubbing off any solid on the molding surface with a dark blue cloth. Essentially no bloom was detected in the samples at either temperature — a very slight amount of bloom could have been obscured by the shine in the cloth from rubbing the molded parts.

It will be seen from the foregoing Table that incorporation of the additive in an amount of about 10–16 weight percent produced excellent results.

EXAMPLES 7–11

Following the procedure of Example 2, an aromatic polyester resin is prepared containing 25 mol percent terephthalic acid, 25 mol percent isophthalic acid, 37.5 mol percent tetrabromobisphenol-A and 12.5 percent 1,6-hexanediol. The following polymers are compounded with about 12 weight percent of the polyester and about 5 percent antimony trioxide to obtain a fire retardant composition:

| Example | Polymer |
| --- | --- |
| 7 | Polyethylene |
| 8 | Polypropylene |
| 9 | Polyethylene terephthalate |
| 10 | Polymethyl methacrylate |
| 11 | Polystyrene |

EXAMPLES 12–15

Following the procedure of Example 2, an aromatic polyester resin is prepared containing 30 mol percent terephthalic acid, 20 mol percent isophthalic acid, 40 mol percent tetrabromobisphenol-A and 10 mol percent ethylene glycol. The following thermoplastic polymers are compounded with about 15 weight percent of the aromatic polyester and about 6 weight percent of antimony trioxide to obtain a fire retardant material:

| Example | Polymer |
| --- | --- |
| 12 | Styrene butadiene rubber |
| 13 | Ethylene-propylene rubber |
| 14 | Ethylene-propylene terpolymer |
| 15 | Butyl rubber |

EXAMPLE 16

The following materials were blended in a Henschel Mill, extruded in a Brabender extruder and molded in a New Britain, screw injection molding machine: polybutylene terephthalate (75.89 parts), decabromodiphenylether (Dow FR 300 BA, 8.30 parts) and glass fibers, antimony oxide and inert filler (58.81 total). The following properties were determined on the molded pieces:

| Fire Retardant Properties | |
|---|---|
| Oxygen Index | 30–32 |
| ASTM-D635 | SE |
| UL-94, 1/8" bar | V-0 |
| UL-94, 1/16" bar | V-0 |

| Physical Properties | |
|---|---|
| Tensile Strength at Break | 17,300 |
| % Elongation at Break | 4.6 |
| Fluxural Strength (psi) | 25,900 |
| Fluxural Modules × $10^6$ | 1.4 |
| Izod Impact (notched, ft-lb) | 1.3 |
| Heat Distortion Temp. (° C, 264 psi) | 197 |
| Appearance | Heavy Bloom at 120° C |

The physical and fire retardant properties of this composition are good, however, it exhibits heavy bloom on heat-ageing as do most compositions containing monomeric halogen additives.

Various changes and modifications can be made in the process and products of this invention without departing from the spirit and the scope thereof. The various embodiments set forth herein were for the purpose of further illustrating the invention but were not intended to limit it.

We claim:

1. In a fire retardant polymer composition comprising a mixture of a linear polymeric glycol ester of terephthalic acid or isophthalic acid and an effective fire retardant proportion of a fire retardant additive, the improvement which comprises employing as the fire retardant additive an aromatic polyester of components consisting essentially of an aromatic dicarboxylic acid and a halogenated bisphenol, said polyester having a glass transition point above about 175° C., and being incompatible with said polymeric ester, and being present in a proportion which provides a bromine content in the range of about 3 to 15 weight percent based on the weight of the polymer composition, and wherein said halogenated bisphenol has the formula:

$$\text{HO}-\underset{(Br)_b}{\overset{(Cl)_a}{\bigcirc}}-\underset{(R_1)_m}{(E)}-\underset{(Br)_d}{\overset{(Cl)_c}{\bigcirc}}-\text{OH}$$

wherein
E is a divalent alkylene, haloalkylene, cycloalkylene, halocycloalkylene, arylene, haloarylene, —O—, —S—, —SO—, —SO$_2$—, —SO$_3$—, —CO—, $$\overset{|}{\underset{|}{R_4P}}=O$$

or $R_5N<$;

$R_1$, is alkyl, haloalkyl, aryl, haloaryl, alkylaryl, haloalkylaryl, arylalkyl, haloarylalkyl, cycloalkyl, or halocycloalkyl;

$R_4$ and $R_5$ are independently selected from hydrogen, $R_1$ and $OR_1$;

m is an integer from 0 to the number of replaceable hydrogen atoms on E;

a, b, c and d are 0 to 4; and a + b is 1 to 4 and c + d is 1 to 4.

2. The composition of claim 1 wherein said aromatic dicarboxylic acid is of the formula HO$_2$C—A—CO$_2$H, in which A is —Ar— or —Ar—B—Ar—, Ar is arylene and B is —O—, —S—, —SO—, —SO$_2$—, —SO$_3$—, —CO—, $R_4P<=O$, $R_5N<$ or alkylene.

3. The composition of claim 2 wherein said aromatic dicarboxylic acid is a mixture of terephthalic acid and isophthalic acid.

4. The composition of claim 1 wherein said aromatic polyester is of ingredients comprising terephthalic acid, isophthalic acid, tetrabromo bisphenol-A and a different polyhydric alcohol.

5. The composition of claim 4 wherein said polyhydric alcohol is a diol.

6. The composition of claim 4 wherein said polyhydric alcohol is hexanediol.

7. The composition of claim 4 wherein said polymeric ester is a polyterephthalate.

8. The composition of claim 7 wherein said polyterephthalate is polybutylene terephthalate.

9. The composition of claim 1 wherein said polymeric ester is a polyterephthalate.

10. The composition of claim 9 wherein said polyterephthalate is polybutylene terephthalate.

11. The composition of claim 1 which also comprises a metallic compound wherein the metal is selected from aluminum, zinc, antimony, bismuth and arsenic.

12. The composition of claim 11 wherein the metallic compound is antimony oxide.

13. A fire retardant polymer composition comprising a mixture of polybutylene terephthalate and an aromatic polyester of components consisting essentially of isophthalic acid, terephthalic acid and tetrabromobisphenol-A, said polyester having a glass transition point above about 175° C., and being incompatible with said polybutylene terephthalate and being present in an effective fire retardant proportion which provides a bromine content in the range of about 3 to 15 weight percent based on the weight of the polymer composition.

14. The composition of claim 13 which also contains about 1 to 30 weight percent antimony trioxide.

15. A fire retardant polymer composition comprising a mixture of polybutylene terephthalate and an aromatic polyester of components consisting essentially of isophthalic acid, terephthalic acid and tetrabromobisphenol-A, and a different diol, said polyester having a glass transition point above about 175° C. and being incompatible with said polybutylene terephthalate and being present in an effective fire retardant proportion which provides a bromine content in the range of about 3 to 15 weight percent based on the weight of the polymer composition.

16. The composition of claim 15 wherein the different diol is hexanediol.

17. The composition of claim 16 which also contains about 1 to 30 weight percent antimony trioxide.

* * * * *